United States Patent
Wallace et al.

(10) Patent No.: US 8,006,399 B2
(45) Date of Patent: Aug. 30, 2011

(54) SURFACE SENSING DEVICE

(75) Inventors: David Sven Wallace, Nympsfield (GB);
Peter Hajdukiewicz, Stroud (GB);
Geoffrey McFarland,
Wotton-under-Edge (GB)

(73) Assignee: Renishaw PLC, Wotton-under-Edge (GB)

( * ) Notice: Subject to any disclaimer, the term of this patent is extended or adjusted under 35 U.S.C. 154(b) by 0 days.

(21) Appl. No.: 12/310,206

(22) PCT Filed: Aug. 31, 2007

(86) PCT No.: PCT/GB2007/003295
§ 371 (c)(1),
(2), (4) Date: Feb. 17, 2009

(87) PCT Pub. No.: WO2008/029094
PCT Pub. Date: Mar. 13, 2008

(65) Prior Publication Data
US 2009/0255139 A1 Oct. 15, 2009

(30) Foreign Application Priority Data
Sep. 5, 2006 (GB) .................................. 0617344.7
May 3, 2007 (GB) .................................. 0708572.3

(51) Int. Cl.
*G01B 5/008* (2006.01)
(52) U.S. Cl. ..................................................... 33/503
(58) Field of Classification Search ................ 33/503, 33/556, 557, 558, 559, 560, 561
See application file for complete search history.

(56) References Cited

U.S. PATENT DOCUMENTS

| | | | |
|---|---|---|---|
| 3,727,119 A | 4/1973 | Stanley et al. | |
| 4,888,877 A | 12/1989 | Enderle et al. | |
| 5,189,806 A * | 3/1993 | McMurtry et al. | 33/503 |
| 5,195,826 A * | 3/1993 | Enderle et al. | 374/142 |
| 6,051,971 A | 4/2000 | Holden | |
| 6,546,643 B2 * | 4/2003 | Lotze et al. | 33/559 |
| 6,854,193 B2 * | 2/2005 | Lotze | 33/502 |
| 7,293,365 B2 * | 11/2007 | McMurtry et al. | 33/556 |

(Continued)

FOREIGN PATENT DOCUMENTS

DE 43 08 823 A1 9/1994

(Continued)

OTHER PUBLICATIONS

Opposition received in European Application No. 07804102.7, dated Nov. 18, 2010.

(Continued)

*Primary Examiner* — Christopher W Fulton
(74) *Attorney, Agent, or Firm* — Oliff & Berridge, PLC (57) ABSTRACT

An apparatus for measuring a surface of a workpiece is described. The apparatus comprises a support, attachable to the moveable arm of a machine, such as a coordinate positioning machine, and rotatable about first and second axes of rotation, the axes driven by first and second motors respectively. The apparatus additionally comprises a surface sensing device for sensing the surface of a workpiece, rotatable about a third axis of rotation. This third axis of rotation is alignable with the first axis of rotation, and when aligned, rotation of the support relative to the surface sensing device is actuatable by the first motor. A method for using an apparatus for measuring a surface of a workpiece is also described.

32 Claims, 11 Drawing Sheets

U.S. PATENT DOCUMENTS

| | | | |
|---|---|---|---|
| 7,415,775 B2 * | 8/2008 | Jordil et al. | 33/559 |
| 2006/0010701 A1 | 1/2006 | Jordil et al. | |
| 2008/0249737 A1 * | 10/2008 | Jordil et al. | 702/152 |
| 2009/0030648 A1 * | 1/2009 | Hunter et al. | 702/152 |

FOREIGN PATENT DOCUMENTS

| | | |
|---|---|---|
| DE | 101 00 352 A1 | 7/2002 |
| DE | 102 60 670 A1 | 7/2004 |
| EP | 0 312 119 A2 | 4/1989 |
| EP | 0 317 967 A2 | 5/1989 |
| EP | 0 392 660 A2 | 10/1990 |
| EP | 1 617 172 A1 | 1/2006 |
| WO | WO 02/27270 A1 | 4/2002 |
| WO | WO 2004/003466 A2 | 1/2004 |

OTHER PUBLICATIONS

Addition to the Opposition received in European Application No. 07804102.7, dated Nov. 18, 2010.

* cited by examiner

SURFACE SENSING DEVICE

The present invention relates to a surface-sensing device for use in position determining apparatus such as, for example, a co-ordinate-measuring machine (CMM), a scanning machine, a machine tool or an inspection/measurement robot.

Such a position determining machine (see for example U.S. Pat. No. 3,727,119 which describes a CMM) is used for measuring a workpiece, and typically comprises an arm moveable in three directions x,y,z relative to a table on which the workpiece is supported. Movement of the arm in each of the directions x,y,z is measured by transducers on the machine, and a probe provided on the arm produces a signal indicating the relationship between the workpiece surface to be measured, and the arm. The position of the surface may thus be determined.

In an alternative machine, for example some types of machine tool, the table moves in x and y and the arm moves in z.

It is known to provide scanning probe apparatus, secured to a co-ordinate-measuring machine, as described in the US patent publication no. US2006/0010701. Such a scanning probe apparatus comprises a probe head, which is rotatable about two mutually perpendicular axes relative to a fixed structure, and a probe assembly including a stylus. In use, the head is mounted on the arm of the machine with one of its axes aligned with the axis of the arm. Transducers associated with each of the rotatable axes of the head determine the orientation of the axis of the probe assembly relative to the axis of the arm of the machine.

Another example of a known probe head is the Renishaw PH9. The PH9 is a two-axis motorised probe head, which orients a probe by means of two serially connected rotors. Each of the rotors may occupy one of a plurality of kinematic rest locations equispaced about its axis of rotation. EP 0392660 relates to a manually operable version of this probe head for use on machines which do not have computer control.

During a scanning operation, the machine and/or the probe head cause the stylus tip to move over the surface of the workpiece, in accordance with instructions from a machine controller, to gather data about the workpiece surface. From the signals provided by the measuring transducers of the machine and probe head, and from the knowledge of the dimensions of the surface sensing device, a prediction can be made about the position of the stylus tip (and therefore of the position of the surface). A typical workpiece may be for example a car engine block, which has numerous holes at a variety of angles. It is desirable to obtain information from the entire surface of the workpiece; therefore the stylus must be able to reach all of the surfaces.

Many probes, for example those with ball styli such as touch trigger probes, are multi-directional; this means that they are able to sense a workpiece in a number of directions. Some probes however are uni-directional, such as optical probes and surface finish probes; this means they are only able to sense a workpiece in one direction, limiting the number of surfaces they can reach.

Due to the varying shapes of the workpiece, and the physical dimensions and limitations of the probe head movement, the stylus tip is sometimes unable to reach the surface of the workpiece. Thus, information about the profile of the surface cannot be obtained.

A first aspect of the present invention provides apparatus for measuring a surface of a workpiece comprising:

an attachment means for attaching a support to the moveable arm of a machine;
a support having a first member rotatable relative to the attachment means about a first axis of rotation, wherein said rotation is actuated by a first motor, and a
a second member rotatable relative to the first member about a second axis of rotation, wherein said rotation is actuated by a second motor, wherein the second axis of rotation is transverse to the first axis of rotation and wherein a surface sensing device is attachable to the second member for rotation therewith;
a surface sensing device for sensing the surface of a workpiece;
a rotation means for allowing rotation of the surface sensing device with respect to the support about a third axis of rotation, wherein the third axis of rotation is alignable with the first axis of rotation;
characterised in that when the first and third axes of rotation are aligned rotation of the support relative to the surface sensing device is actuatable by the first motor.

Preferably, a holder is provided for holding the surface sensing device stationary during said rotation of the support relative to the surface sensing device.

Advantageously a pin is provided on one of the holder and the surface sensing device which is engageable with at least one recess on the other of the holder and the surface sensing device, for holding the surface sensing device stationary during the rotation of the support relative to the surface sensing device.

Preferably the first and second axes of rotation of the support are orthogonal.

Advantageously, the third rotational axis of the surface-sensing device intersects the second axis of the support.

In some cases the third rotational axis of the surface-sensing device is the generally longitudinal axis of the surface sensing device. However, the third axis may alternatively be, for example, at an angle to the longitudinal axis of the surface sensing device.

Rotation about the third axis of the probe or stylus, may allow a uni-directional probe to act as a multidirectional probe, increasing the number of surfaces that can be accessed by uni-directional probes.

In some embodiments the surface sensing device senses a surface in a direction transverse to or offset from the third axis of rotation. In other embodiments the surface sensing device may sense, for example in the direction of the third axis of the surface sensing device.

The surface sensing device may be a contact probe, or a non-contact probe. Non-contact probes include for example optical probes, capacitive probes and inductive probes.

Conveniently the surface-sensing device comprises a probe body, a stylus, and a stylus tip.

Advantageously the surface-sensing device comprises a surface finish probe. Alternatively, the surface sensing device may comprise for example a laser spot probe or a laser line probe.

Preferably the rotation means allows the device to rotate through up to and including, 360 degrees. However, the rotation means may allow the device to rotate through greater than 360 degrees. Alternatively it may allow it to rotate continuously, without end stops, for example by making use of slip rings to provide electrical contact between the probe and the probe head.

Conveniently, the rotation means is additionally manually actuatable.

A second aspect of the present invention provides a method for using an apparatus for measuring a surface of a workpiece, the apparatus comprising a support, an attachment means for attaching the support to the moveable arm of a machine, a surface sensing device for sensing the surface of a workpiece, the support having a first member rotatable relative to the attachment means about a first axis of rotation, actuated by a first motor; and a second member rotatable relative to the first member about a second axis of rotation, actuated by a second motor; wherein the second axis of rotation is transverse to the first axis of rotation and wherein the surface sensing device is attachable to the second member for rotation therewith, a rotation means for allowing rotation of the surface sensing device with respect to the support about a third axis of rotation, wherein the third axis of rotation is alignable with the first axis of rotation, characterised in that the method comprises the following steps:

aligning the first and third rotational axes; and activating the first motor so as to actuate rotation of the support relative to the surface sensing device.

Conveniently, the method further comprises the steps of:

driving the device along the surface of the workpiece; and gathering information about the workpiece surface.

Preferably, measuring the surface of the workpiece comprises scanning the surface of the workpiece.

Preferred embodiments of the invention will now be described by way of example and with reference to the accompanying drawings, wherein:

FIGS. 3 f g h and i show four embodiments of the stylus of the surface-sensing device.

FIG. 3l shows a schematic diagram of means for detecting the sensing relationship of the surface-sensing device with the surface of the workpiece in a cranked stylus, as shown for a straight stylus in FIG. 3j.

Figure 1:
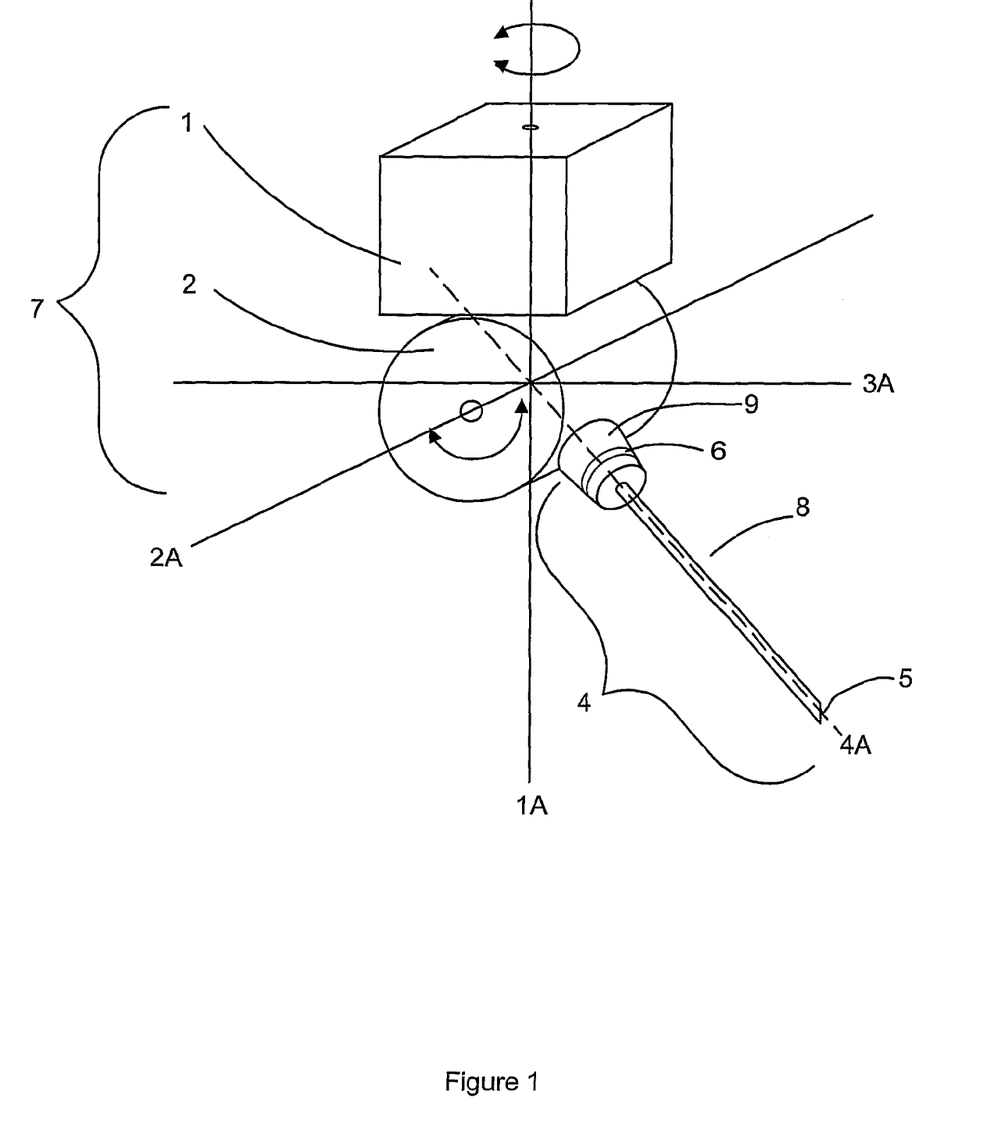
FIG. 1 shows an isometric view of a preferred embodiment of apparatus according to the invention.

Referring to FIG. 1 a co-ordinate system in a co-ordinate-positioning machine can be defined by three mutually orthogonal axes, 1A, 2A and 3A, whereby in use 1A is substantially vertical and 3A is substantially horizontal. If axis 1A is taken to lie at 0 degrees in the plane of the paper, movement from said 0 degrees position to a 90 degrees position, also in the plane of the paper, can be brought about by rotation in an anticlockwise direction about an axis 2A.

Figure 2:
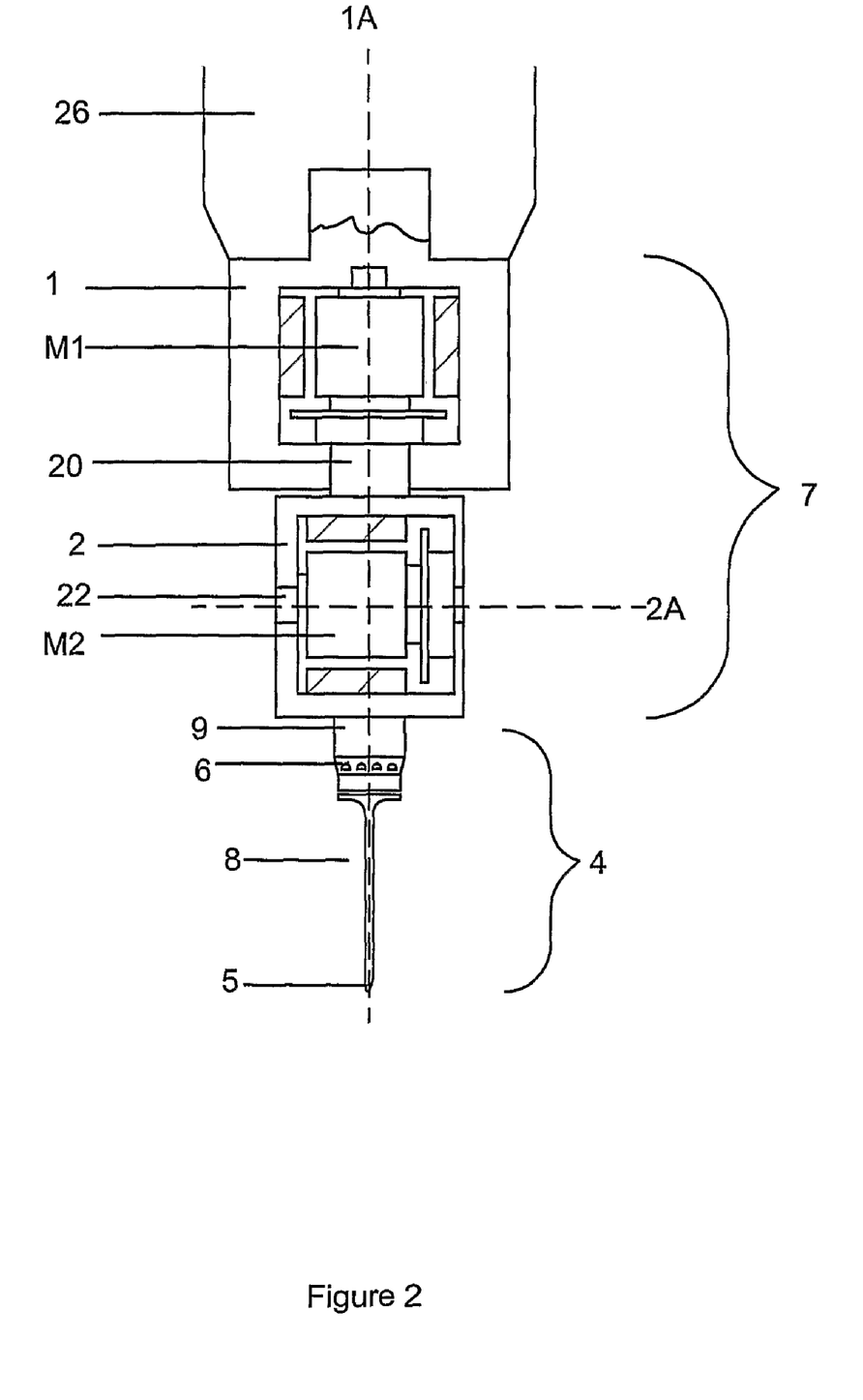
FIG. 2 shows a section through the device in a plane defined by axes 1A and 2A in FIG. 1.

FIG. 1 shows a preferred embodiment of the invention in three dimensions, FIG. 2 shows a section through the device in a plane defined by axes 1A and 2A in FIG. 1. A support 7, in this case an articulating probe head, comprises first and second housing members 1 and 2 respectively. The first housing member 1 is adapted for attachment to a position determining apparatus 26 (for example the arm of a CMM), and houses a motor M1 for effecting angular displacement of a first shaft 20 about a first axis 1A. Attached to the first shaft 20 is the second housing member 2, which houses a motor M2 for effecting angular displacement of a second shaft 22 about a second axis 2A. Attached to the second shaft 22 for rotation therewith is a surface-sensing device 4 such as a surface-sensing probe.

The surface sensing probe 4 extends along an axis 4A, transverse to and intersecting axis 2A. Said probe comprises a probe body 9, a stylus 8, and a stylus tip 5. Additionally, the probe is provided with a rotation means 6, which allows the device to rotate generally about a third axis, in this case, its longitudinal axis. In this embodiment the rotation means allows the device to rotate through up to 360 degrees.

In the preferred embodiment the rotation means is actuated by the drive in the support (motor M1 in this embodiment), using a slipping ring and an external fixture. In this case the device may rotate through up to 360 degrees, as wires between the two moving parts prevent further rotation.

In this embodiment, the rotation means is provided on the probe body of the surface-sensing device, enabling the device to rotate about its longitudinal axis. Alternatively, the rotation means may be provided by an additional member located between the support and the surface-sensing device. In the latter case the surface-sensing device rotates about the longitudinal axis of the additional member, which should be substantially aligned with the axis of the surface-sensing device; therefore the device rotates generally about its longitudinal axis.

The surface-sensing device may be for example a contact probe, or a non-contact probe. Non-contact probes include, for example, optical, capacitance and inductance probes.

In particular, the invention is useful for single axis probes such as optical probes and surface finish probes. This is because for these types of probes especially, rotation about the longitudinal axis (axis 4A) greatly increases the number of surfaces the probe can access. Rotation about this axis is also particularly useful for laser line probes as it is possible to rotate the line about the axis of the surface sensing device (the third axis as mentioned above).

Figure 3A:
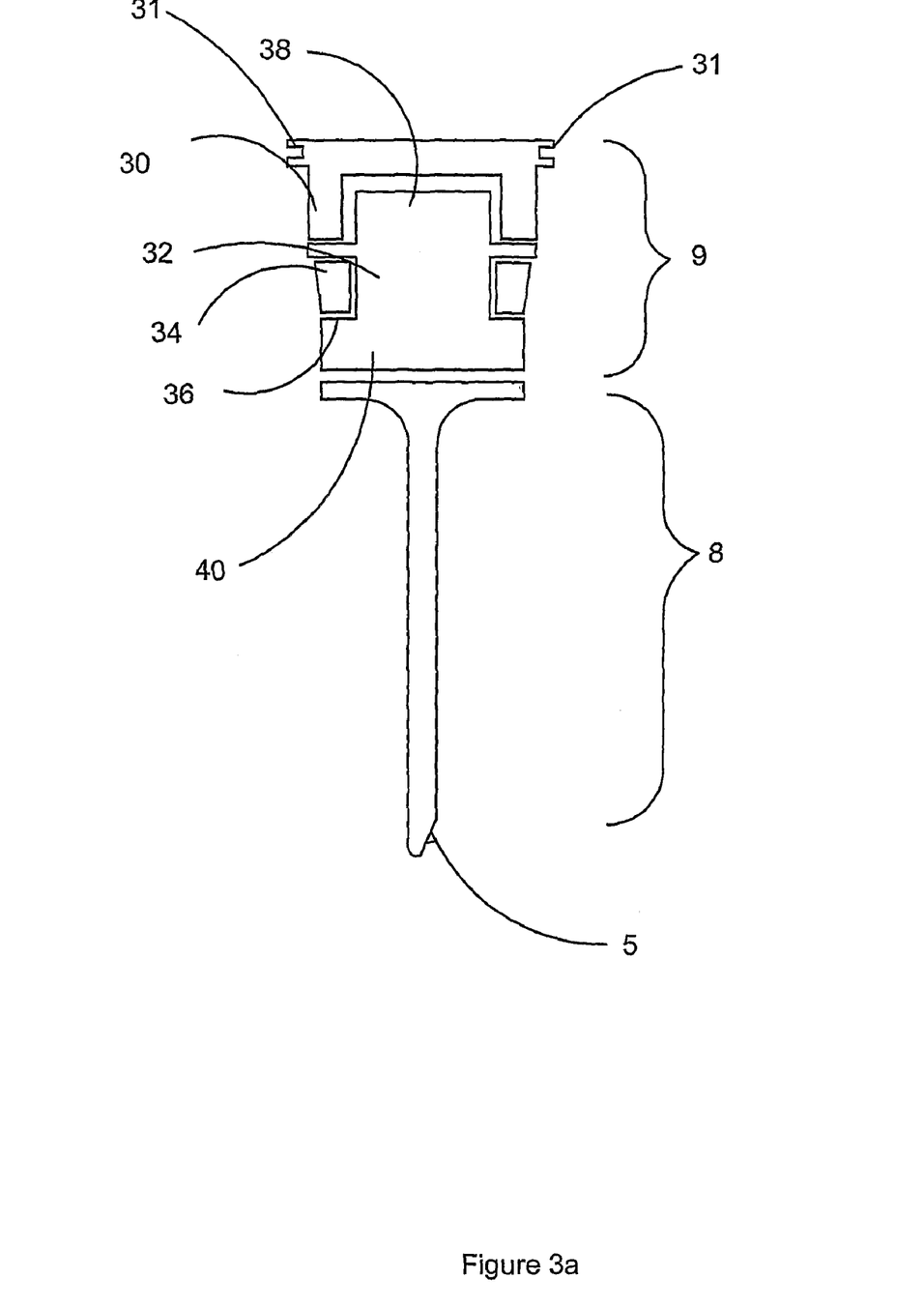
FIGS. 3a and 3b show cross-section and side views respectively of a preferred embodiment of the surface-sensing device.

FIG. 3a shows a section through a preferred embodiment of the surface-sensing probe. The probe includes means for rotation about its longitudinal axis. The probe body 9 comprises a probe mount 30, a main body part 32, and a slipping ring 34. The main body part is held at one end 38 by the probe mount 30, and its other end 40 supports a detachable stylus 8. The main body part has a recess 36 around its circumference into which the slipping ring 34 fits. The main body part 32 and the probe mount 30 are attached so that they are rotatably moveable with respect to each other; this movement has a low slipping torque due to the materials of the parts. The slipping ring 34 lies closer to the end 40 of the main body part 32 that supports the detachable stylus 8. The slipping torque between the slipping ring 34 and the main body part 32 is higher than the slipping torque between the main body part 32 and the probe mount 30. This higher slipping torque may be achieved by sprung plungers pushing against the ring 34 or the main body part 32 of the probe, to increase the friction between the two parts. As a consequence of this the slipping ring 34 is harder to turn than the probe mount 30, with respect to the main body part 32 of the probe. The probe mount 30 is provided with a circumferential groove 31 for mounting it onto, for example, a stylus change port as shown in FIG. 3c.

Figure 3B:
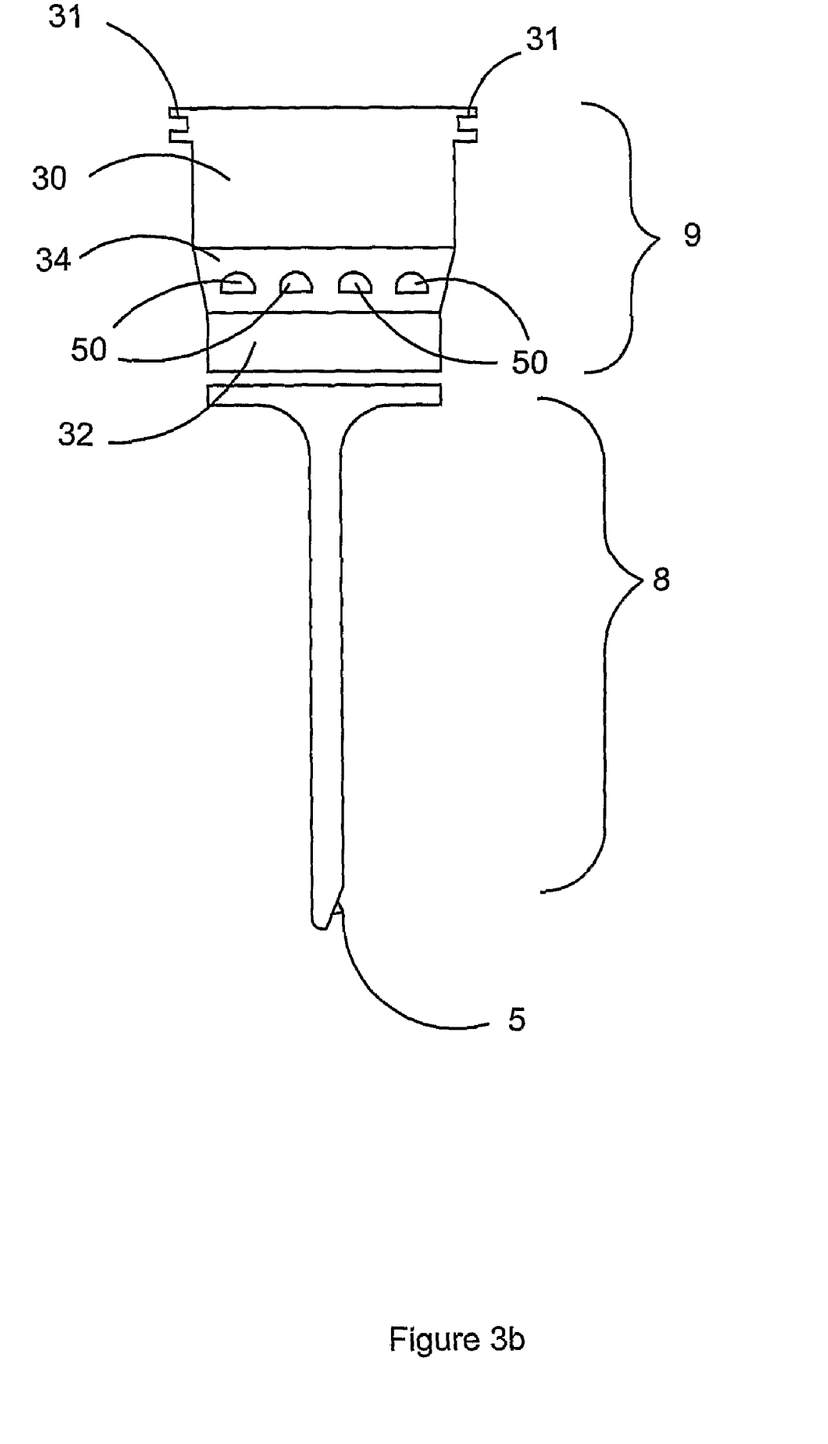
Figure 3C:
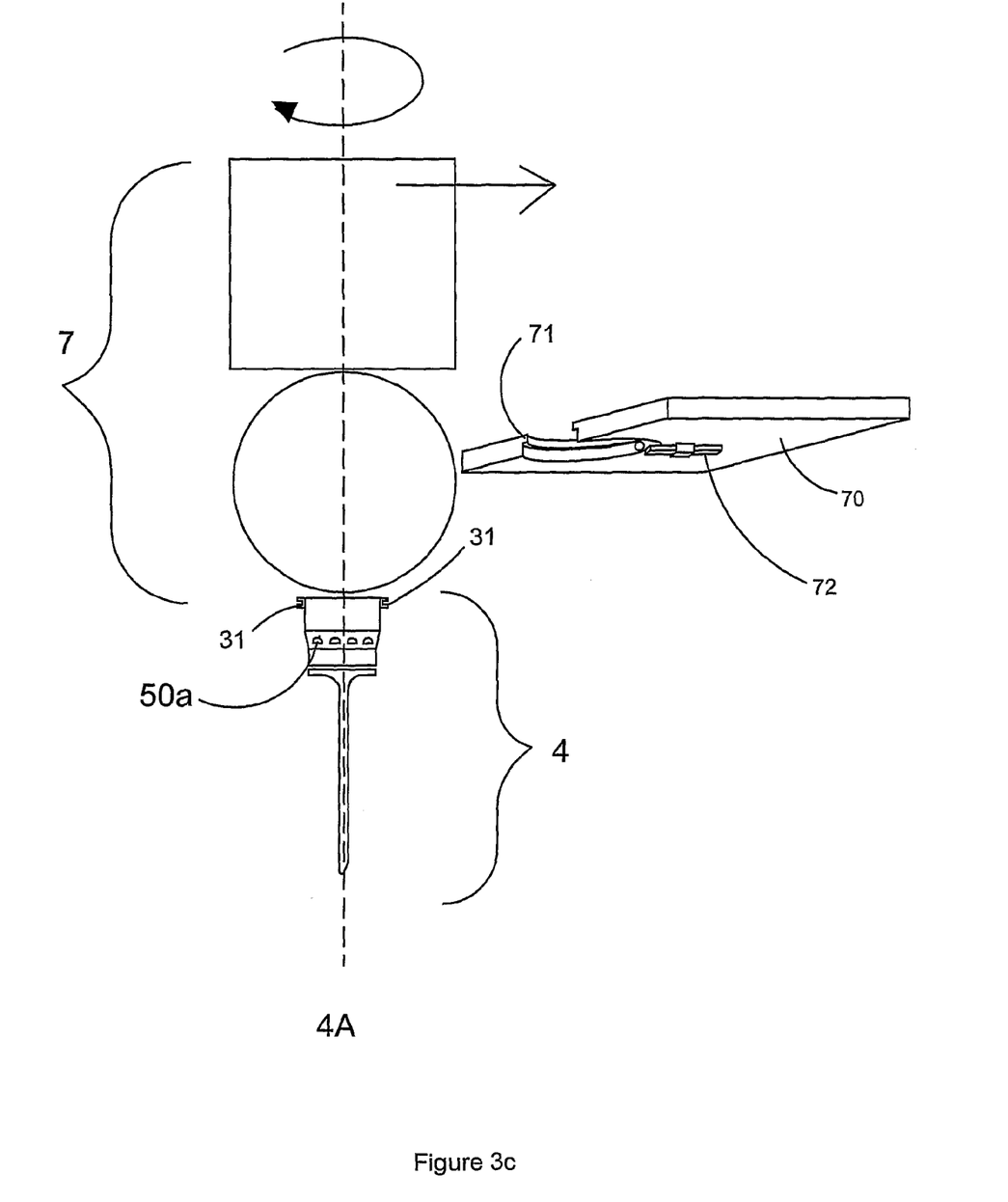
FIG. 3c shows an underside view of a stylus change-port 70 adapted to include a sprung pin 72, and a side view of a surface sensing device mounted on an articulating probe head.

FIG. 3b shows a front on view of a preferred embodiment of the surface-sensing probe. The slipping ring 34 is provided with a series of recesses in the form of notches 50 located around the circumference. FIG. 3c shows an underside view of a stylus change-port 70 adapted to include a sprung pin 72, and a front view of the surface sensing probe mounted on an articulating probe head 7.

In order to change the orientation of the stylus tip 5 with respect to the support 7 (see FIG. 1), a number of steps are carried out. Firstly the longitudinal axis 4A of the surface-sensing probe 4 is aligned with the rotational axis 1A of the first housing member 1 of the support 7. The surface-sensing probe 4 can be rotated about its longitudinal axis 4A, powered by the drive means M1 of the support 7. The device is moved into the stylus change port 70, which is fitted with a sprung pin 72 orientated such that the pin may engage with any one of the notches 50 provided on the first slipping ring 34.

Additionally, the change port 70 is provided with a lip 71 which fits into the groove 31 provided on the probe mount 30, allowing the probe to be stored in the change port 70 when not in use.

As the surface sensing probe 4 is rotated, one notch 50a on the slipping ring 34 engages with the sprung pin 72 on the stylus change port. The pin 72 holds the slipping ring 34 stationary; this in turn holds the main body part of the probe 32, and in turn the stylus 8, stationary due to the high slipping torque between the slipping ring 34 and main body part 32. Other ways of holding the probe body and stylus still relative to the support are possible, such as a socket receptor, magnetic holder, mechanical clamp, or electromechanical clamp, or a friction holder.

The lower slipping torque between the main body part 32 and the probe mount 30 allows the probe mount to continue to rotate with the rotation of the support 7. The probe mount 30 and the support 7 rotate relative to the main body part 32 until the probe mount 30 and support 7 reach a reference position with respect to the main body part 32. At this point the probe mount and the main body part stop relative to each other by means of a 'sliding peg' mechanism, as illustrated in FIG. 3d.

Figure 3D:
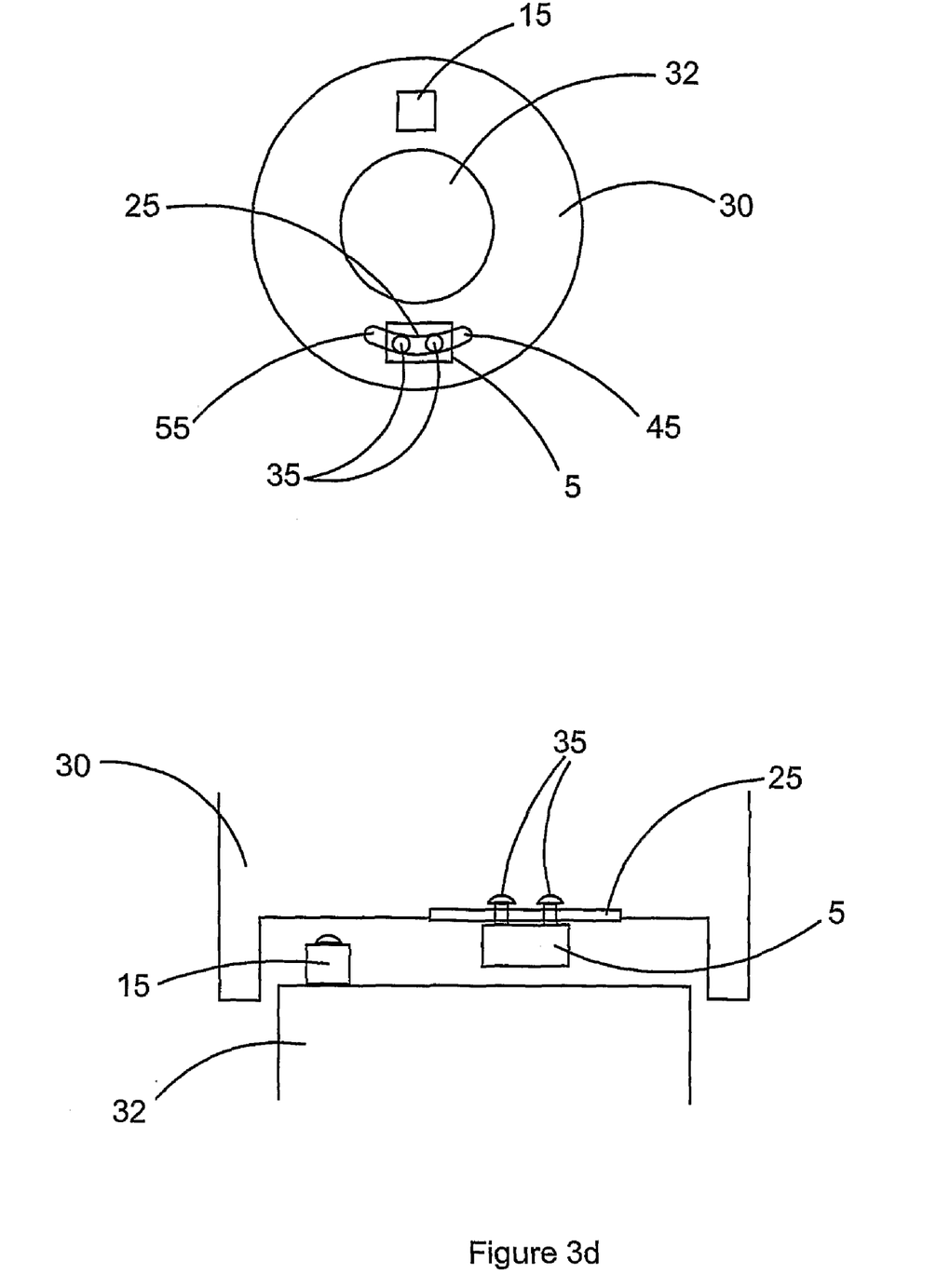
FIG. 3d shows plan and side cross-sectional views respectively through the probe body 9, illustrating the reference position stop of the probe.

FIG. 3d shows a plan and side cross-sectional view through the probe body 9. A curved slot 25 is provided at a known position in the probe mount 30. A first stop block 5 is secured to the probe mount 30 through the slot 25 by two spacers 35. Said first stop block 5, along with the spacers 35, is moveable in two directions along the slot 25.

A second stop block 15 is provided on the main body part 32 of the probe. As the probe mount 30 is rotated relative to the main body part 32 of the probe, the first stop block 5 is moved towards the second stop block 15, for example in a clockwise direction. When the first stop block 5 contacts the second stop block 15, the probe mount continues to rotate, stopping when a spacer 35 contacts the edge 45 of the slot 25. The position of the probe mount 30 and support 7 reach a reference position with respect to the main body part 32.

The first stop block 5 may also be moved towards the second stop block 15 in an anti-clockwise direction. After the two stop blocks have made contact the probe mount 30 continues to rotate until a spacer 35 contacts the other edge of the slot 55.

The first and second stop blocks and slot are sized such that this mechanism ensures that the reference position is always at exactly the same point, independent of the side from which the stop block on the probe mount 30 is approached.

The position of the main body part of the probe 32, and consequently the stylus 8 and stylus tip 5, is then defined relative to the support 7 in a reference position. Other ways to define a reference position of the probe body relative to the support are possible. These include for example, any kind of reference marks such as and optical reference mark for use with a camera, a magnetic reference mark (as described in our U.S. Pat. No. 6,051,971), alignable reference marks. Alternatively a detent mechanism may be used.

Once the reference position is reached and the position of the main body part of the probe 32 is defined relative to the support 7, the support 7 is then able to rotate itself and the probe mount 30 to position the support and probe mount at the exact angle required, relative to the stylus 8 and the stylus tip 5.

The movement of the support relative to the probe body 32 and stylus 8 from the reference position can be measured using positioning means, such as encoders, which may already be provided in the support 7. Alternatively it may be measured indirectly for example using a scale and a vernier, one provided on the stationary probe body 32 or slipping ring 34, and the other on the moving probe mount 30 or support 7. In this case a viewing camera, either in the port or separate to the port, may be used to assess the distance traveled by the support relative to the probe body and stylus, or the distance may be assessed by eye.

The movement of the support relative to the probe body 32 and stylus 8 from the reference position may alternatively be measured using positioning means, such as an encoder, in the probe head itself. In this case the positioning means in the probe head will feed information on the relative positions of the probe body and the support, back to the motors in the support.

Alternatively again, the probe body may have an indexer, which can rotated a defined number of index points to a known position.

When the support and probe mount 30 are positioned at the exact angle required relative to the stylus 8 and the stylus tip 5, the support 7 is driven away from the stylus change port 70 and the sprung pin 72, disengaging the slipping ring 34. In this way the stylus tip 5 can be orientated in different angles about the longitudinal axis of the probe with respect to the support 7, enabling the surface-sensing probe 4 to reach a greater variety of surfaces.

The orientation of the stylus tip 5 with respect to the support 7 may also be carried out using for example a motor in the probe body 9, and a slipping ring. In this case the orientation of the stylus tip 5 is adjusted independently of the support 7.

Figure 3E:
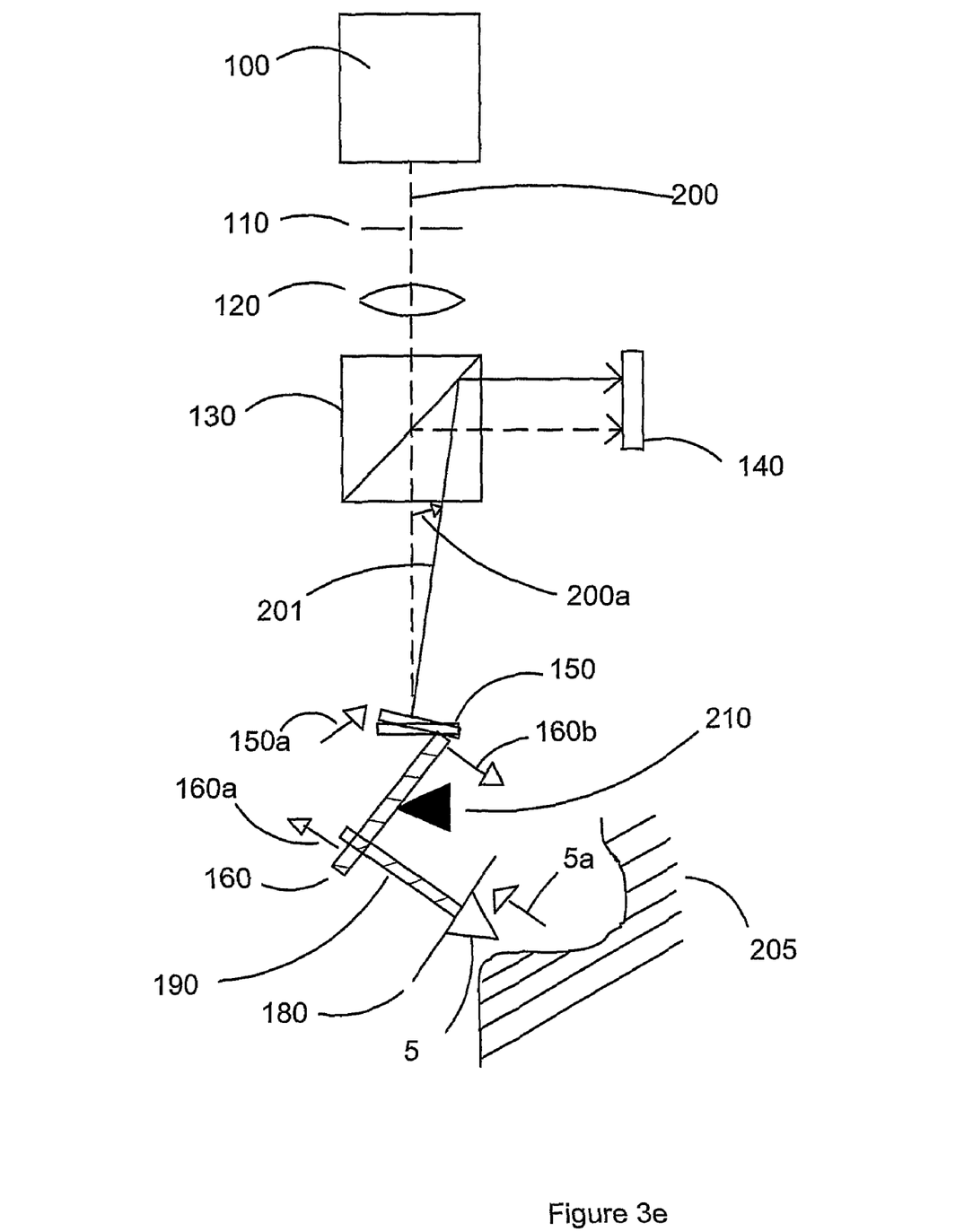
FIG. 3e shows a schematic diagram of the means for detecting the sensing-relationship of the surface-sensing device with the surface of the workpiece in a preferred embodiment of the surface finish probe.

FIG. 3e shows a schematic diagram of the means for detecting the sensing relationship of the surface-sensing device with the surface of the workpiece, in this case using a surface finish probe. A laser 100 in the main body part 32 of the probe body 9 directs a beam 200 towards a mirror 150. The beam 200 passes through an aperture 110 and a lens 120 into a beam splitter 130. The beam 200 passes through the beam splitter 130 and onto the mirror 150, the beam is reflected off the mirror and back to the beam splitter 130, where it is then directed towards a photo sensitive diode (PSD) 140. The mirror 150 is connected to the proximal end of a lever 160, which is balanced on a fulcrum 210. At its distal end the lever 160 is connected to one end of a stylus stem 190 which is connected at its other end to the stylus tip 5. A skid 180 rests along either side of the tip. The stylus tip 5 is preferably a diamond tip, as it needs to be hard wearing to not break as it is dragged along a surface.

Figure 3F:
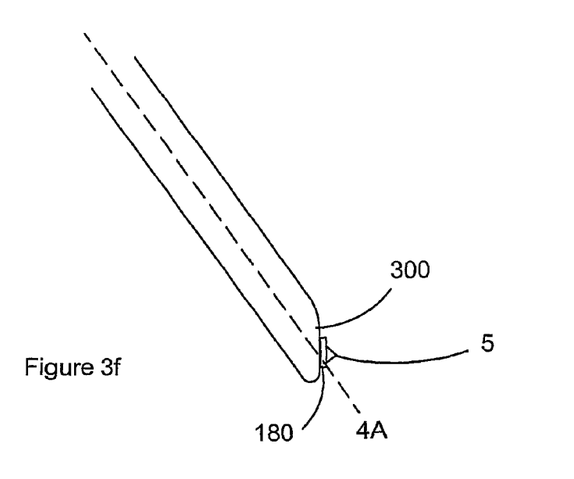
Figure 3G:
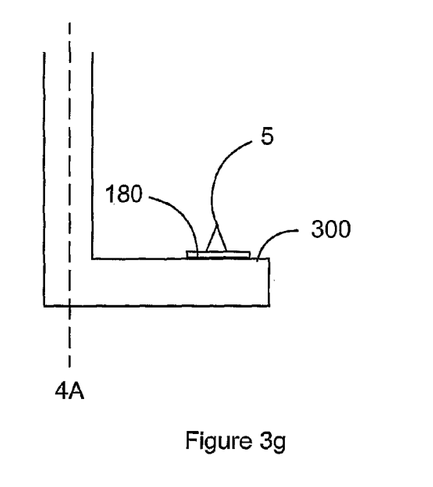
Figures 3H, 3I:
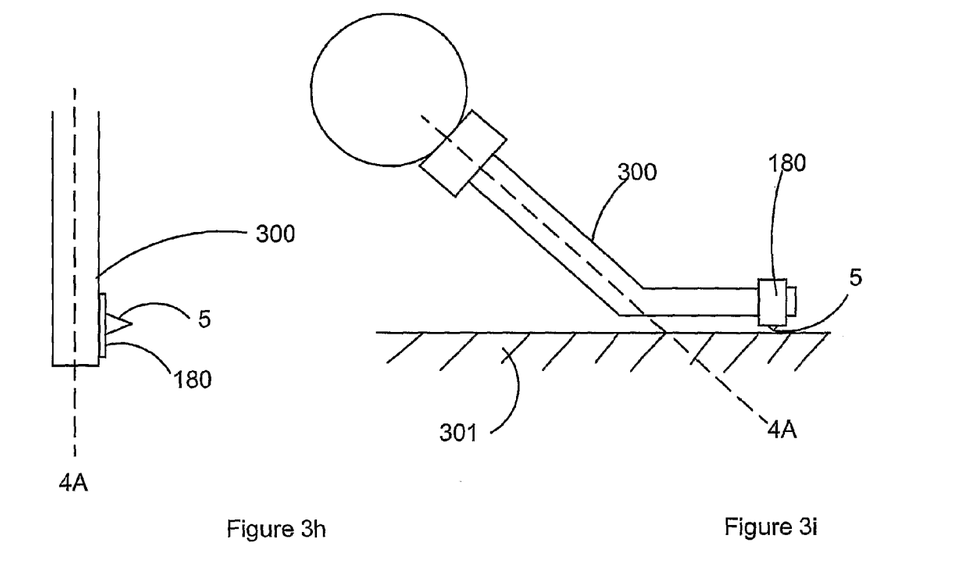
Figure 3I:
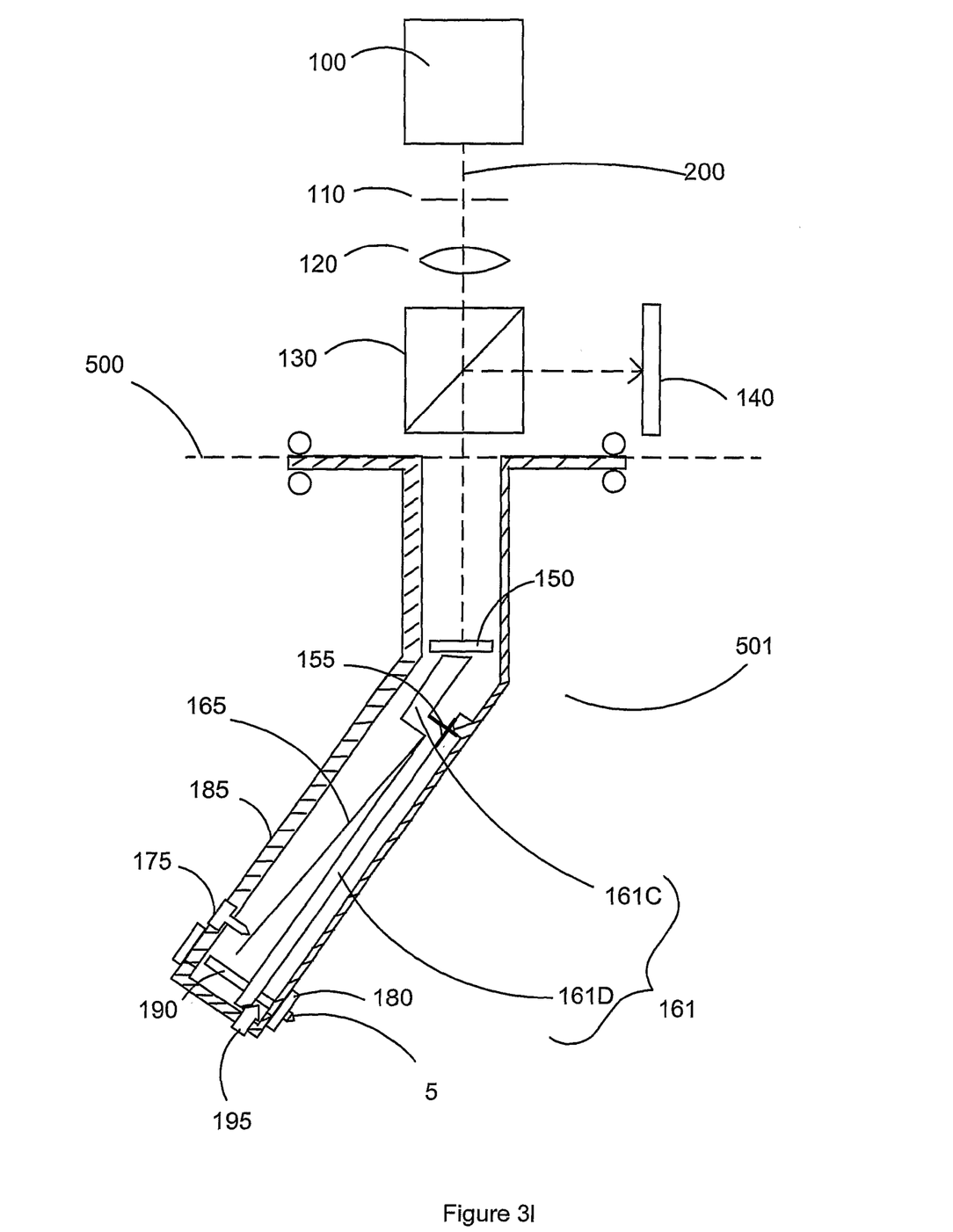
Figure 3J:
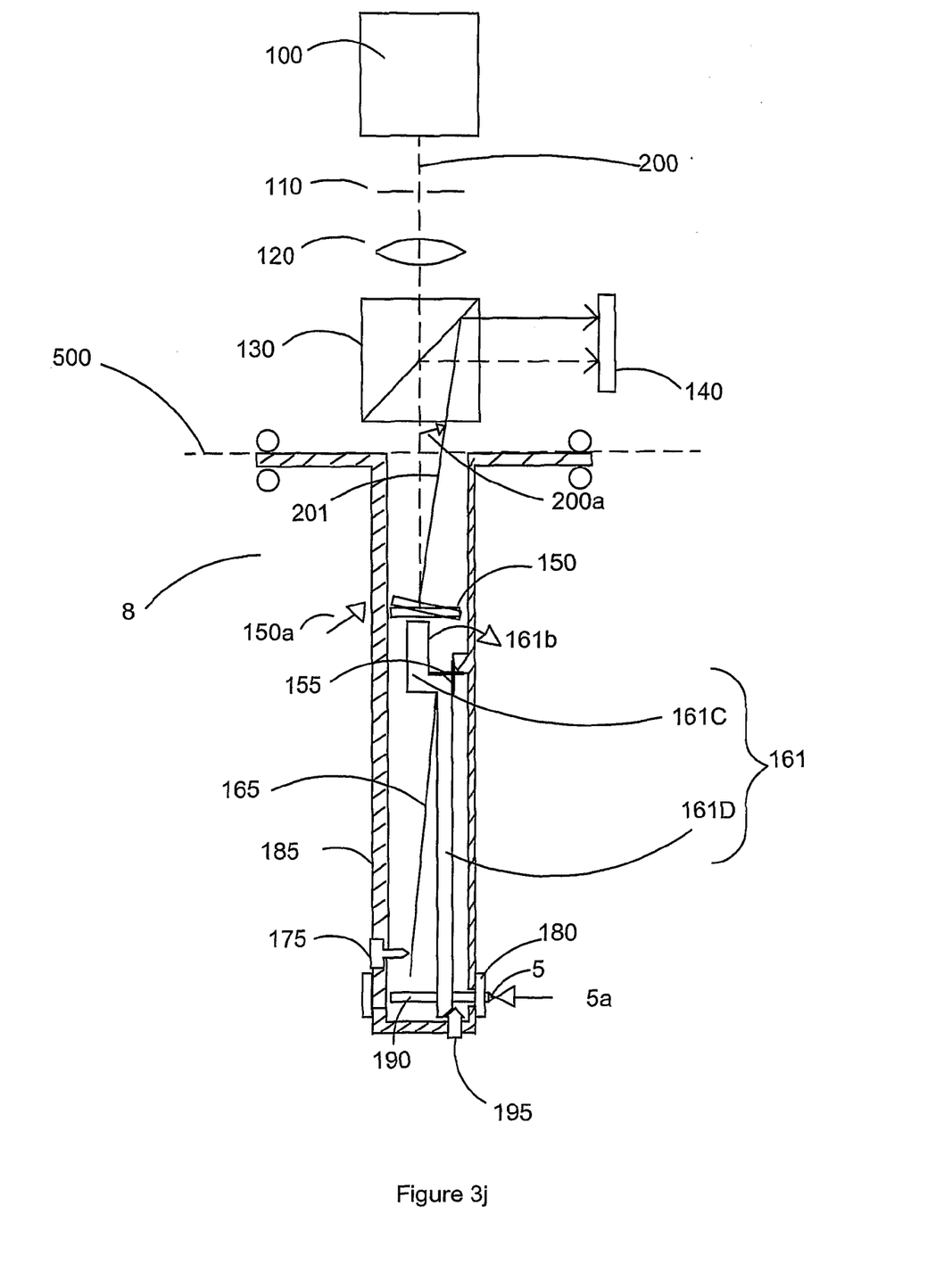
FIG. 3j shows a schematic diagram of alternative means for detecting the sensing relationship of the surface-sensing device with the surface of the workpiece.

FIG. 3j shows a schematic diagram of an alternative means for detecting the sensing relationship of the surface-sensing device with the surface of the workpiece. The stylus 8 (as shown in FIG. 3b), housed by housing 185, is detachable from the probe head along line 500. The lever 161 is fixed with respect to the housing of the stylus 185 by 2 crossed flat springs 155. When the stylus tip 5 contacts the surface of a workpiece the stylus tip 5 will be pushed back into the housing of the stylus. This movement causes the lever 161 to rotate about the pivot point where the cross springs meet, in turn the mirror is caused to move. A screw 175 can be tightened to apply pressure to another spring 165 which urges the stylus tip 5 towards the workpiece. The stylus tip 5 typically protrudes up to 100 microns from the edge of the skid 180. A screw 195 is provided adjacent to the lever 161 to adjust the amount that the stylus tip 5 protrudes from the edge of the skid 180.

Figure 3K:
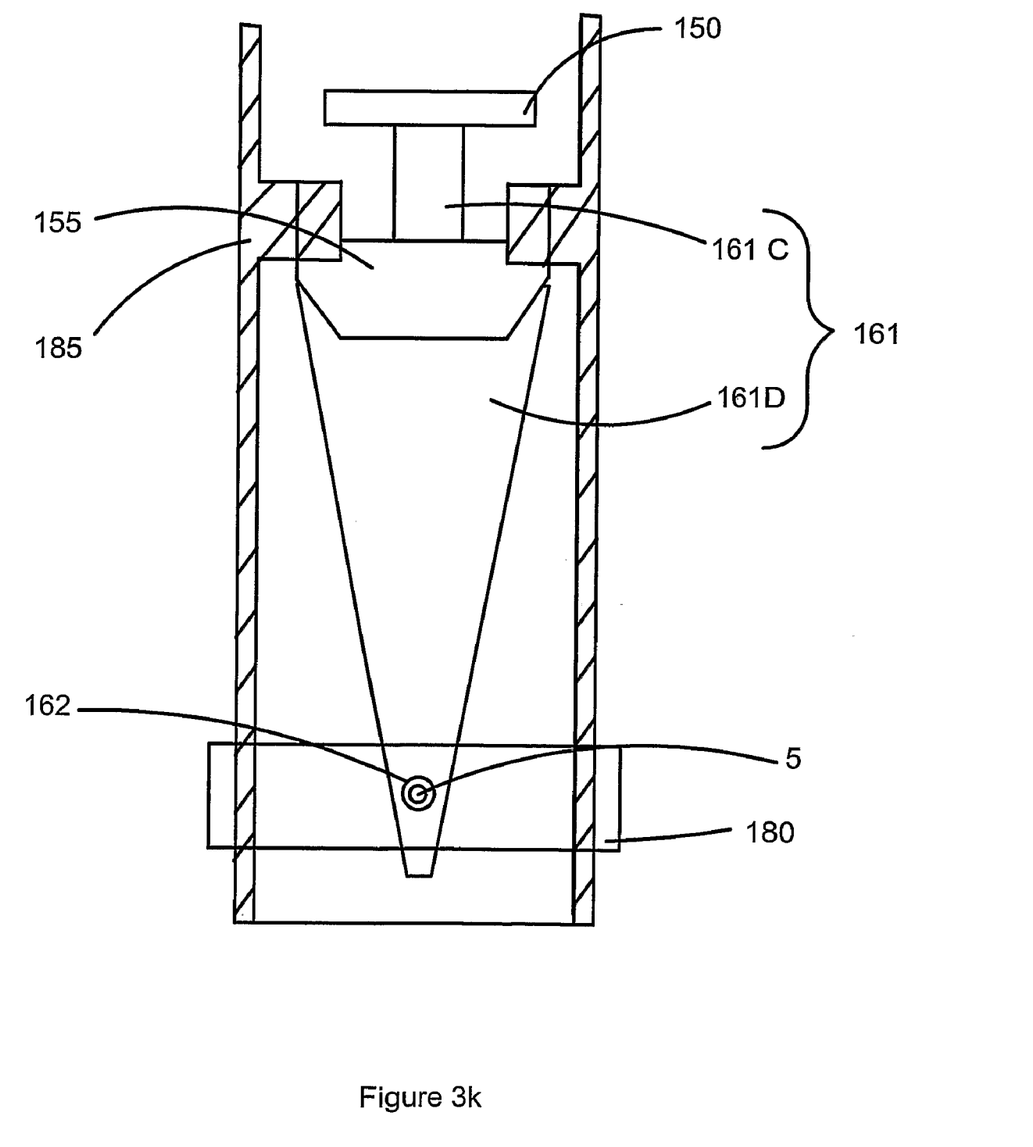
FIG. 3k shows a plan cross-sectional view of the alternative means for detecting the sensing relationship of the surface-sensing device with the surface of the workpiece as shown in FIG. 3j.

FIG. 3k shows a plan cross-sectional view of the alternative means for detecting the sensing relationship of the surface-sensing device with the surface of the workpiece as shown in FIG. 3j. The lever 161 has 2 sections, a first section 161C which is provided proximal to the mirror 150, and a second section 161D which is provided proximal to the stylus tip 5. The second section 161D is triangular in shape so as to minimise sideways movement of the lever and thus the stylus tip 5 (which protrudes from the stylus through a hole 162 in the skid 180).

As the surface-sensing device is moved along the surface of a workpiece the skid 180 follows the rough contour (surface waviness) of the surface whilst diamond tip 5 follows the detailed surface texture of the surface. As the diamond tip 5 is displaced by the surface of the workpiece the position of the lever 160 varies, as does the position of the mirror 150. As the mirror moves, the laser beam-directed towards it is reflected at a different angle, and as a consequence the laser spot on the PSD is moved, as shown in FIG. 3e. In this way the profile of the surface of the workpiece can be measured. In FIGS. 3e and 3j, the movement of the diamond tip 5 as it moves over the workpiece surface 205, and the resulting movement of the lever, mirror, and beam is shown by arrows 5a, 160a, 160b, 150a and 200a. The deflected path of the beam between the mirror and the PSD is shown by line 201.

In a preferred embodiment, the skid is, fixed relative to the probe stylus, and the probe stylus is stiff. As the surface-sensing device is dragged along a surface, the stiff stylus and fixed skid allow the surface-sensing device to be pushed towards the surface with a substantially constant torque.

In an alternative embodiment the stylus may be deflectable and the skid moveable; in this case the deflection of the stylus can be transduced to determine the skid's contact with the workpiece surface.

FIGS. 3f, 3g and 3h, and 3i show four embodiments of the orientation of the stylus tip 5 and stylus face 300 of the surface-sensing device. The stylus tip 5 is perpendicular to the skid 180, and to the face of the stylus 300. The face of the stylus 300 and thus the stylus tip 5 may be provided at an angle to the longitudinal rotational axis of the probe 4A, as shown in FIG. 3f, to aid the stylus tip 5 when moving into large holes. As shown in FIG. 3g the face 300 of the stylus may alternatively be provided at 90 degrees to the longitudinal rotational axis of the probe 4A in order to inspect under a workpiece; in this case the stylus tip 5 lies parallel to the longitudinal rotational axis of the probe. In a third embodiment, as shown in FIG. 3h, the stylus face 300 may be provided parallel to the longitudinal rotational axis of the probe 4A. In this case the stylus tip 5 is perpendicular to the longitudinal rotational axis of the probe, improving accessibility of the inside surface of small bored holes.

In a fourth embodiment as shown in FIG. 3i the stylus is cranked at a non-90 degree angle. The stylus tip 5 points in a direction transverse to the longitudinal axis of the probe 4A. When sensing the surface of a workpiece the stylus tip 5 must point in a direction perpendicular to the surface 301. Due to certain restrictions on the movement of the articulating probe head, and the size of the articulating probe head, it is not possible to achieve the described perpendicular sensing arrangement with a straight stylus as shown in FIG. 3h. The cranked stylus of FIG. 3i allows the stylus tip to be positioned so that the probe head clears the surface, and thus allows the stylus tip 5 to access a greater number of surfaces from a perpendicular position.

FIG. 3l shows a schematic diagram of means for detecting the sensing relationship of the surface-sensing device with the surface of the workpiece in a cranked stylus. This is similar in many ways to the stylus shown in FIG. 3j where similar reference numerals denote similar parts. The stylus 501, housed by housing 185, is detachable from the probe head along line 500. The lever arrangement is provided in the cranked portion of the stylus whilst the light path arrangement is provided in the straight part of the stylus. The mirror is provided at the interface between the two parts at an angle so as to return the optical beam to the beam splitter in a similar way to that of the straight stylus. This means that the cranked stylus can use the same optics and thus the same probe mount as used by the straight stylus.

In general the stylus face 300 and stylus tip 5 may be provided at any angle, with respect to the longitudinal rotational axis of the probe, for convenience of workpiece surface access.

If, for example, the probe tip is aligned with the longitudinal axis of the surface-sensing device, the probe has no advantage with respect to access when rotated about the longitudinal axis of the surface sensing device. Consequently, to benefit from the advantage of increased accessibility of workpiece surfaces by rotating the surface-sensing device about its longitudinal axis, the probe tip must be transverse to or offset from said longitudinal axis.

The invention claimed is:

1. An apparatus for measuring a surface of a workpiece comprising:
   a support;
   an attachment device configured to attach the support to a moveable arm of a machine;
   a surface sensing device configured to sense the surface of the workpiece;
   the support including:
      a first member rotatable relative to the attachment device about a first axis of rotation, actuated by a first motor, and
      a second member rotatable relative to the first member about a second axis of rotation, actuated by a second motor;
      wherein the second axis of rotation is transverse to the first axis of rotation and wherein the surface sensing device is attachable to the second member for rotation therewith;
   a rotation device configured to allow rotation of the surface sensing device with respect to the support about a third axis of rotation, the third axis of rotation is alignable with the first axis of rotation,
   wherein when the first and third axes of rotation are aligned, rotation of the support relative to the surface sensing device is actuatable by the first motor; and
   a holder configured to hold the surface sensing device stationary during said rotation of the support relative to the surface sensing device.

2. An apparatus according to claim 1 further including a pin provided on one of the holder and the surface sensing device, which is engageable with at least one recess on the other of the holder and the surface sensing device, configured to hold the surface sensing device stationary during the rotation of the support relative to the surface sensing device.

3. An apparatus according to claim 1 wherein the first and second axes of rotation of the support are orthogonal.

4. An apparatus according to claim 1 wherein the third rotational axis of the surface sensing device intersects the second axis of the support.

5. An apparatus according to claim 1 wherein the third rotational axis of the surface sensing device is the generally longitudinal axis of the surface sensing device.

6. An apparatus according to claim 1 wherein the surface sensing device senses a surface in a direction transverse to or offset from the third axis of rotation.

7. An apparatus according to claim 1 wherein the surface sensing device is a contact probe.

8. An apparatus according to claim 1 wherein the surface sensing device is a non-contact probe.

9. An apparatus according to claim 1 wherein the surface sensing device comprises a probe body, a stylus, and a stylus tip.

10. An apparatus according to claim 1 wherein the surface sensing device comprises a surface finish probe.

11. An apparatus according to claim 1 wherein the rotation device allows the device to rotate through up to 360 degrees.

12. An apparatus according to claim 1 wherein the rotation device allows the device to rotate through greater than 360 degrees.

13. An apparatus according to claim 1 wherein the rotation device allows the device to rotate continuously.

14. An apparatus according to claim 1 wherein the rotation device is additionally manually actuatable.

15. A method for using an apparatus for measuring a surface of a workpiece, the apparatus including a support, an attachment device configured to attach the support to a moveable arm of a machine, a surface sensing device for sensing the surface of the workpiece, the support including a first member rotatable relative to the attachment device about a first axis of rotation, actuated by a first motor, and a second member rotatable relative to the first member about a second axis of rotation, actuated by a second motor; wherein the second axis of rotation is transverse to the first axis of rotation and wherein the surface sensing device is attachable to the second member for rotation therewith, a rotation device configured to allow rotation of the surface sensing device with respect to the support about a third axis of rotation, wherein the third axis of rotation is alignable with the first axis of rotation, and a holder configured to hold the surface sensing device stationary during said rotation of the support relative to the surface sensing device, wherein the method comprises the following steps:
aligning the first and third rotational axes; and
activating the first motor so as to actuate rotation of the support relative to the surface sensing device.

16. A method according to claim 15, further comprising the steps of:
driving the device along the surface of the workpiece; and
gathering information about the workpiece surface.

17. A method according to claim 16 further comprising scanning a workpiece.

18. An apparatus for measuring a surface of a workpiece comprising:
a support;
an attachment device configured to attach the support to a moveable arm of a machine;
a unidirectional probe or surface finish probe configured to sense the surface of the workpiece;
the support including:
a first member rotatable relative to the attachment device about a first axis of rotation, actuatable by a first motor; and
a second member rotatable relative to the first member about a second axis of rotation, actuatable by a second motor;
wherein the second axis of rotation is transverse to the first axis of rotation and wherein the unidirectional probe or surface finish probe is attachable to the second member for rotation therewith; and
a rotation device configured to allow rotation of the unidirectional probe or surface finish probe with respect to the support about a third axis of rotation, the unidirectional probe or surface finish probe being configured to sense a surface in a direction transverse to the third axis of rotation.

19. An apparatus according claim 18 wherein the first and second axes of rotation of the support are orthogonal.

20. An apparatus according claim 18 wherein the third rotational axis, about which the unidirectional probe or surface finish probe is rotatable, intersects the second axis of the support.

21. An apparatus according to claim 18 wherein the third rotational axis, about which the unidirectional probe or surface finish probe is rotatable, is the generally longitudinal axis of the unidirectional probe or surface finish probe.

22. An apparatus according to claim 18 wherein the unidirectional probe or surface finish probe is at least one of a contact probe and a non-contact probe.

23. An apparatus according to claim 18 wherein the unidirectional probe or surface finish probe comprises a probe body, a stylus, and a stylus tip.

24. An apparatus according to claim 18 wherein the rotation device allows the unidirectional probe or surface finish probe to rotate through up to and including 360 degrees.

25. An apparatus according to claim 18 wherein the rotation device allows the unidirectional probe or surface finish probe to rotate through greater than 360 degrees.

26. An apparatus according to claim 18 wherein the rotation device allows the unidirectional probe or surface finish probe to rotate continuously.

27. An apparatus according to claim 18 wherein the rotation device is a motor.

28. An apparatus according to claim 18 wherein the unidirectional probe is at least one of a laser spot probe and a laser line probe.

29. An apparatus for measuring a surface of a workpiece according to claim 18 wherein the surface finish probe is a unidirectional probe.

30. A method for using an apparatus for measuring a surface of a workpiece, the apparatus comprising a support, an attachment device for attaching the support to a moveable arm of a machine, a unidirectional probe or surface finish probe configured to sense the surface of the workpiece, the support including a first member rotatable relative to the attachment device about a first axis of rotation, actuatable by a first motor, and a second member rotatable relative to the first member about a second axis of rotation, actuatable by a second motor; wherein the second axis of rotation is transverse to the first axis of rotation and the unidirectional probe or surface finish probe is attachable to the second member for rotation therewith, and a rotation device for allowing rotation of the unidirectional probe or surface finish probe with respect to the support about a third axis of rotation, the unidirectional probe or surface finish probe senses a surface in a direction transverse to the third axis of rotation, the method comprising:
activating the rotation device to orient the unidirectional probe or surface finish probe relative to the support.

31. A method according to claim 30, further comprising:
driving the surface finish probe or unidirectional probe along the surface of the workpiece; and
gathering information about the workpiece surface.

32. A method according to claim 31 further comprising scanning a workpiece.

* * * * *